Patented Apr. 24, 1923.

1,452,974

UNITED STATES PATENT OFFICE.

WILLIAM KIPPENHAN, OF ALLENTON, WISCONSIN.

MOTOR-DRIVEN LAND ROLLER.

Application filed March 28, 1922. Serial No. 547,390.

*To all whom it may concern:*

Be it known that I, WILLIAM KIPPENHAN, a citizen of the United States, and resident of Allenton, in the county of Washington and State of Wisconsin, have invented certain new and useful Improvements in Motor-Driven Land Rollers; and I do hereby declare that the following is a full, clear, and exact description thereof.

The invention relates to self propelled rollers adapted for use in breaking up or otherwise subjecting land to a rolling action.

It comprises a front frame carrying a motor geared to a roller, the frame being pivoted with respect to a rear frame to which rollers are secured having pivotal movement in a transverse plane. Convenient means for guiding and controlling the speed are provided operable from a driver's seat supported by the rear frame.

A primary object of the invention is the provision of rollers associated with the rear frame and pivotally movable with respect thereto, traveling in a transverse plane. This enables the vehicle to adjust itself readily to the contours of the land, and where the device is used for road work, the rollers fit properly upon the crown of the road so that extraordinary stress is not transmitted to the frame of the device and the wear and tear and breakage is eliminated.

An important feature is the provision of a drive on both ends of the front roller which properly distributes propulsive force and eliminates excessive torque and pressure on operative parts, danger of stripping the gears, and the like, being eliminated.

A feature of the novel construction is the disposition of the steering mechanism and the clutch control in such manner that they may be readily operated from a conveniently disposed driver's seat. A clutch lever is operable from adjacent the seat, as is, also, the steering wheel.

Additional objects are extreme simplicity of construction, strength and durability of parts.

With the above and other objects in view, which will appear as the description proceeds, my invention resides in the novel construction, combination and arrangement of parts, substantially as hereinafter described and more particularly defined by the appended claims, it being understood that such changes in the precise embodiment of the herein disclosed invention may be made as come within the scope of the claim.

In the accompanying drawing, I have illustrated the complete example of the physical embodiment of the present invention constructed according to the best mode I have so far devised for the practical application of the principles thereof, and in which:—

Figure 1:
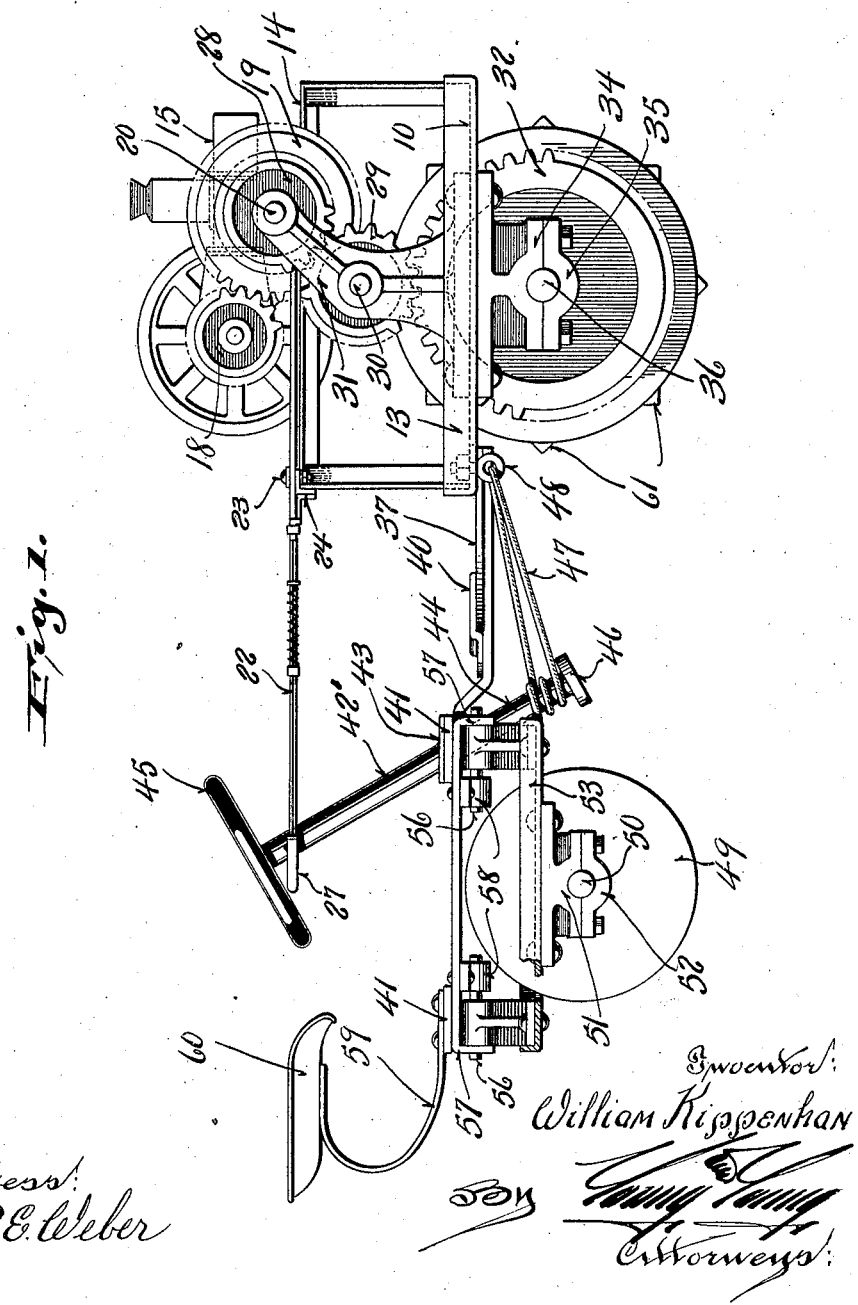
Figure 1 is a side elevation of the invention.
Figure 2:
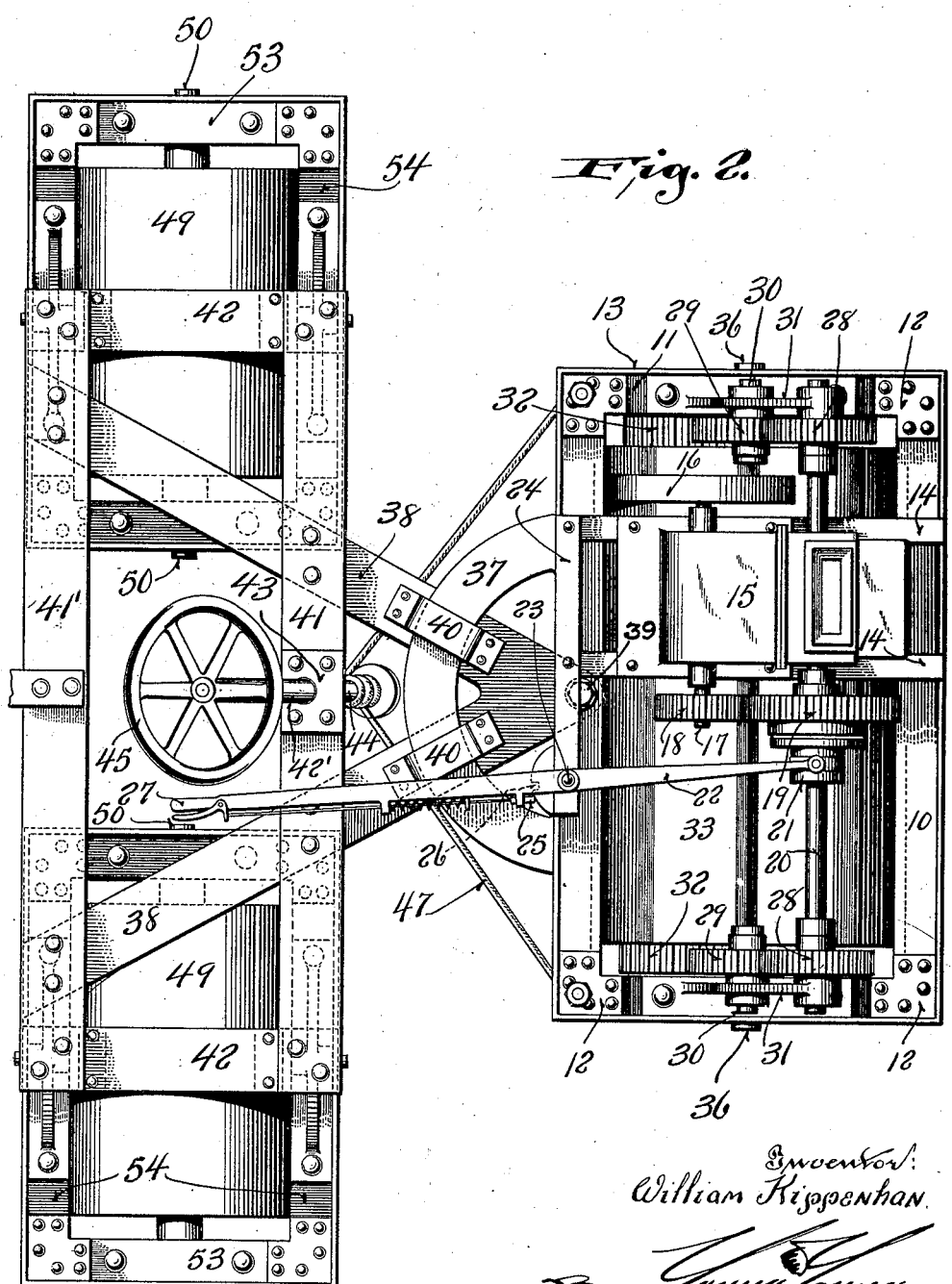
Figure 2 is a plan thereof.

The front frame comprises elongated members 10 and shorter members 11 secured together by corner plates 12 and being provided with an upwardly directed peripheral flange 13 which reinforces and strengthens the structure. To the frame a pair of longitudinal supports 14 are secured carrying motor 15 which rotates fly wheel 16 and shaft 17 with which the gear 18 is rigid. Gear 18 meshes with gear 19 and is operative to rotate shaft 20 when clutch 21 is drawn in, the clutch being capable of being thrown out by means of lever 22 pivoting at 23 on plate 24 secured to the frame. When lever 22 is thrown out, detent 25 is engaged in a recess 26 in plate 24, the handle 27 of lever 22 being conveniently disposed for manipulation by the driver.

When clutch 21 is in, shaft 20 is rotated moving gears 28 rigid with the ends thereof and meshing with gears 29 carried for rotation by pins 30 on brackets 31 which support the ends of shaft 20. Gears 29 mesh with gears 32 rigid with roller 33. It is thus seen that motor 15 operates to apply propulsive power to both ends of roller 33. This operation is advantageous in that if the drive were to one side only of the roller, excessive torque would be imposed upon shaft 20. The meshing and cooperation gears on one side only of the machine would receive all the burden and be subjected to danger of stripping. Furthermore, only one pair of the bearings 34 and 35, receiving trunnions 36, on each side of the machine secured to frame members 11 would be subjected to the wearing action of the propulsive force applied to gear 32 adjacent thereto. Thus, one side of the machine would tend to wear out more quickly than the other and danger of breakage would be created.

Segment 37 is secured to the front frame member and V 38 is pivoted at 39 with respect thereto, the V carrying guides 40 which receive segment 37 being rigid with members 41, 41' extending transversely of the machine and being secured to members 42 making a rear frame. Member 41 carries tube 42' secured by means of an integral flange 43 and housing. A steering shaft 44 is rigid with steering wheel 45, shaft 44 having a disc-like head 46. A flexible steering member 47 is swung about steering shaft 44 and prevented from falling therebelow by head 46. On the rotation of steering wheel 45, steering member 44 is operated to rotate the front frame member with respect to the rear frame member on pivot 39, steering member 44 being secured to the front frame member by eyes 48.

Rollers 49 have trunnions 50 journalled in bearings 51 and 52 secured to side frame members 53 rigid with frame members 54. Frame members 54 have secured thereto supports 55 rotatable on pins 56 directed through lugs 57 downwardly extending from members 42 and through supports 58. Secured on frame member 41 is a spring 59 supporting seat 60. As is apparent, rollers 49 are free to rotate in a transverse plane on pivots 56 and are thus enabled to accommodate themselves to irregularities in the land.

Where the device is used on road work, the pivoting of the rollers enables them to fit snugly into the crown of the road, thus transverse stresses are eliminated and danger of breakage of the parts is removed. The convenient disposal of seat 60, steering wheel 45, and handle 27 renders the driving of the device very convenient.

Rollers 49 may be modified in any desired manner and may be provided with radial teeth or cutting portions. Roller 33 is provided with ribs 61 adapted to break up the ground, but may be modified within the skill of one versed in the art in any desired manner, the invention not being limited to the specific modification shown.

I claim:—

In a motor driven land roller, the combination of a front roller, a frame therefor, a rear frame pivoted to said front frame, a pair of rollers, a pair of trunnions on each of said rear rollers, a frame for each of said rear rollers secured to and permitting rotation of said trunnions, and means securing each of said last mentioned frames for pivotal movement in a transverse plane with respect to said rear frame.

In testimony that I claim the foregoing I have hereunto set my hand at Milwaukee, in the county of Milwaukee and State of Wisconsin.

WILLIAM KIPPENHAN.